(12) United States Patent
Ruan et al.

(10) Patent No.: US 8,752,787 B2
(45) Date of Patent: Jun. 17, 2014

(54) ELECTRICAL DRIVEN FLYING SAUCER BASED ON MAGNETIC SUSPENSION

(75) Inventors: Xiao-Gang Ruan, Beijing (CN); Xu-Yang Hou, Beijing (CN)

(73) Assignee: Beijing University of Technology, Beijing (CN)

( * ) Notice: Subject to any disclaimer, the term of this patent is extended or adjusted under 35 U.S.C. 154(b) by 160 days.

(21) Appl. No.: 13/058,775

(22) PCT Filed: Jan. 21, 2010

(86) PCT No.: PCT/CN2010/070224
§ 371 (c)(1),
(2), (4) Date: Feb. 11, 2011

(87) PCT Pub. No.: WO2011/050594
PCT Pub. Date: May 5, 2011

(65) Prior Publication Data
US 2011/0272520 A1  Nov. 10, 2011

(30) Foreign Application Priority Data

Oct. 30, 2009  (CN) .......................... 2009 1 0209567

(51) Int. Cl.
*B64C 39/06* (2006.01)
*B64C 27/20* (2006.01)

(52) U.S. Cl.
USPC ...................................... 244/23 C; 244/12.2

(58) Field of Classification Search
CPC .............................. B64C 27/20; B64C 39/001
USPC ......... 244/17.23, 12.1, 23 C, 39, 17.11, 34 A, 244/1 R, 12.2
See application file for complete search history.

(56) References Cited

U.S. PATENT DOCUMENTS

| | | | | |
|---|---|---|---|---|
| 6,575,401 | B1 * | 6/2003 | Carver | 244/12.2 |
| 7,032,861 | B2 * | 4/2006 | Sanders et al. | 244/23 A |
| 7,410,123 | B2 * | 8/2008 | Nunnally | 244/23 C |
| 2004/0094662 | A1 | 5/2004 | Sanders, Jr. et al. | 244/12.5 |
| 2007/0062543 | A1 * | 3/2007 | Bastian et al. | 128/844 |

FOREIGN PATENT DOCUMENTS

| | | |
|---|---|---|
| CN | 1114279 A | 1/1996 |
| CN | 1120008 A | 4/1996 |
| CN | 1224681 A | 8/1999 |
| CN | 200176263 Y | 1/2009 |
| CN | 201254294 Y | 6/2009 |
| WO | WO 93/14973 A2 | 8/1993 |
| WO | WO 01/87707 A1 | 11/2001 |

OTHER PUBLICATIONS

Chinese International Search Report (PCT/ISA/210) of International PCT Application No. PCT/CN2010/070224, dated Aug. 5, 2010.

* cited by examiner

*Primary Examiner* — Brian M O'Hara
(74) *Attorney, Agent, or Firm* — J.C. Patents

(57) ABSTRACT

A magnetic suspension electric rotor flying saucer comprises: a saucer shell (1), a saucer cabin (2), a rotor system (3), and a control system (4). The rotor wing system is a magnetic suspension electric rotor wing system (3) composed of a magnetic suspension rotor wing wheel (5), an electrodynamic ring (6), a magnetic suspension shaft (7) and magnetic suspension lead rails (8). The electrodynamic ring (6), the magnetic suspension shaft (7) and the magnetic suspension lead rails (8) are fixed on the saucer shell (1). The magnetic suspension rotor wing wheel (5) is suspended in space limited by the electrodynamic ring (6), the magnetic suspension shaft (7) and the magnetic suspension lead rails (8) and rotates around the magnetic suspension shaft (7) by the electromagnetic thrust.

3 Claims, 4 Drawing Sheets

ELECTRICAL DRIVEN FLYING SAUCER BASED ON MAGNETIC SUSPENSION

FIELD OF THE INVENTION

The present invention pertains to the field of aviation aircrafts and particularly relates to an electrical driven flying saucer based on magnetic suspension.

BACKGROUND OF THE INVENTION

The lift and thrust of a rotary-wing aircraft are formed by a rotary wing rotating at a high speed. The power for the rotation of the rotary wing comes from an engine. The current rotary-wing aircrafts include all kinds of rotary-wing helicopters. The rotary wing and engine are two separate and independent systems and connected with a transmission mechanism.

Compared with ordinary rotary-wing aircrafts, the particularity of a rotary-wing flying saucer is that the rotary-wing system and its power system need to be installed inside a saucer shell. The internal space of the saucer shell is limited and restricts the structure and layout of the rotary-wing system and its power system. Therefore, the paramount task for the design of a rotary-wing flying saucer is how to make full use of the limited internal space of the saucer shell and design a rotary-wing system and its power system with a compact structure, reasonable layout, small weight, high motive power conversion efficiency and easy manipulation and control.

When the rotary wing rotates at a high speed in the saucer shell, due to pneumatic vortex, flexibility of the rotary wing, maneuver of the saucer and other factors, the rotary wing and the saucer shell might collide with each other, resulting in failure and even a serious accident. For more information, please refer to Patent CN 1120008A. There exists the foregoing defect.

Therefore, one of the important tasks for the design of a rotary-wing flying saucer is how to avoid the contact and friction between the high-speed rotary wing and the interior of the saucer shell, reduce the noise of the rotary wing during high-speed rotation as well as the vibration of the saucer shell and the saucer cabin, raise motive power conversion efficiency, reduce energy consumption and guarantee the operational safety of the rotary wing and the flying saucer.

Similar to ordinary rotary-wing aircrafts, reactive torque will be generated when the rotary wing of a flying saucer rotates. For more information, please refer to Patent CN 1114279A. There is the problem that the body of the flying saucer suffers uncontrollable reactive torque. Therefore, how to overcome the reactive torque of the rotary-wing flying saucer is also another important task for the design of a rotary-wing flying saucer.

SUMMARY OF THE INVENTION

The object of the present invention is to make full use of the limited internal space of the saucer shell and design and construct a rotary-wing flying saucer which has a compact structure, reasonable layout, small weight, high motive power conversion efficiency and owns an easily manipulated and controlled rotary-wing system and its power system.

The electrical driven flying saucer based on magnetic suspension provided in the present invention comprises a saucer shell, a saucer cabin, a rotary-wing system and a control system, wherein the rotary-wing system is a magnetic suspension electromotive rotary-wing system and comprises magnetic suspension rotary-wing wheels, an electromotive ring, a magnetic suspension shaft and a magnetic suspension guide rail. The electromotive ring, the magnetic suspension shaft and the magnetic suspension guide rail are fixed to the saucer shell. The magnetic suspension rotary-wing wheels are suspended in the space restricted by the electromotive ring, the magnetic suspension shaft and the magnetic suspension guide rail and go around the magnetic suspension shaft under an electromagnetic thrust.

The magnetic suspension rotary-wing wheels comprise blades, a magnetic suspension inner ring and a magnetic suspension outer ring. The blades are connected between the magnetic suspension inner ring and the magnetic suspension outer ring along the radial direction (X-X) to form an impeller. The magnetic suspension guide rail includes a magnetic suspension inner ring guide rail and a magnetic suspension outer ring guide rail. The magnetic suspension inner ring guide rail comprises an inner ring upper guideway and an inner ring lower guideway. The magnetic suspension outer ring guide rail comprises an outer ring upper guideway and an outer ring lower guideway. The magnetic suspension inner ring of the magnetic suspension rotary-wing wheels surrounds the magnetic suspension shaft in the radial direction (X-X) and is disposed between the inner ring upper guideway and the inner ring lower guideway in the axial direction (Y-Y). The magnetic suspension outer ring of the magnetic suspension rotary-wing wheels is embedded in the electromotive ring in the radial direction (X-X) and disposed between the outer ring upper guideway and the outer ring lower guideway in the axial direction (Y-Y).

The magnetic suspension inner ring of the magnetic suspension rotary-wing wheels and the magnetic suspension shaft form a repulsive or attractive magnetic suspension radial bearing in the radial direction (X-X) based on the principle that like magnetic poles repel, but opposite magnetic poles attract, and relying on permanent magnets, electromagnets or superconducting magnets, and make the magnetic suspension rotary-wing wheels suspended on the magnetic suspension shaft in the radial direction (X-X). The magnetic suspension inner ring of the magnetic suspension rotary-wing wheels and the magnetic suspension inner ring guide rail form a repulsive or attractive magnetic suspension axial bearing in the axial direction (Y-Y) based on the principle that like magnetic poles repel, but opposite magnetic poles attract, and relying on permanent magnets, electromagnets or superconducting magnets, and make the magnetic suspension inner ring suspended between the inner ring upper guideway and the inner ring lower guideway. The magnetic suspension outer ring of the magnetic suspension rotary-wing wheels and the magnetic suspension outer ring guide rail form a repulsive or attractive magnetic suspension axial bearing in the axial direction (Y-Y) based on the principle that like magnetic poles repel, but opposite magnetic poles attract, and relying on permanent magnets, electromagnets or superconducting magnets, and make the magnetic suspension outer ring suspended between the outer ring upper guideway and the outer ring lower guideway.

The magnetic suspension rotary-wing wheels of the rotary-wing system, the electromotive ring and the magnetic suspension shaft constitute a magnetic suspension electric engine. The electromotive ring is a stator, the magnetic suspension rotary-wing wheels constitute a rotor, the magnetic suspension shaft is a spindle, the electromotive ring controls the changes of the current flowing in the electromotive ring according to electromagnetic conversion principle and generates a rotating magnetic field along the ring, and this rotating magnetic field generates a magnetic force upon the magnetic field in the magnetic suspension outer ring of the magnetic suspension rotary-wing wheels and pushes the rotation of the magnetic suspension rotary-wing wheels.

As an improvement of the present invention, two sets of independent magnetic suspension electromotive rotary-wing systems are superposed and mounted coaxially inside the saucer shell in the axial direction (Y-Y), i.e. the upper rotary-wing system and the lower rotary-wing system. Coaxial axial dual magnetic suspension electromotive rotary wings are formed, wherein the upper rotary-wing system and the lower rotary-wing system rotate in reverse directions, adopt reverse inclination directions of blades, can guarantee the coaxial thrusts in the same direction will overcome or offset the reactive torque generated during rotation of the rotary wings and may realize automatic control for self-rotating angles and self-rotating angular velocity of the flying saucer through controlling the velocities and velocity difference of the upper rotary-wing system and the lower rotary-wing system.

As an alternative improvement of the present invention, two sets of independent magnetic suspension electromotive rotary-wing systems are superposed and mounted coaxially inside the saucer shell in a radial direction (X-X), i.e. the inner rotary-wing system and the outer rotary-wing system. Coaxial radial dual magnetic suspension electromotive rotary wings are formed, wherein the inner rotary-wing system and the outer rotary-wing system rotate in reverse directions, adopt reverse inclination directions of blades, can guarantee the coaxial thrusts in the same direction will overcome or offset the reactive torque generated during rotation of the rotary wings and may realize automatic control for self-rotating angles and self-rotating angular velocity of the flying saucer through controlling the velocities and velocity difference of the inner rotary-wing system and outer rotary-wing system.

The magnetic suspension electromotive flying saucer designed in the present invention makes full use of the limited internal space of the saucer shell and has a compact design structure, reasonable layout, small weight and high motive power conversion efficiency. Further, its rotary-wing system and power system can be easily manipulated and controlled. The design of the rotary-wing suspension structure avoids the contact and friction between the high-speed rotary-wing and the interior of the saucer shell, reduce the noise of the rotary wing during high-speed rotation as well as the vibration of the saucer shell and the saucer cabin, raise motive power conversion efficiency, lower energy consumption and guarantee the operational safety of the rotary wing and the flying saucer. The two improvement solutions mentioned in the present invention overcome the problem of reactive torque of the rotary wing under the precondition of meeting the foregoing requirements, and can realize stable and easy power control of the rotary wing.

The present invention is described below in details in connection with the accompanying drawings and embodiments.

DETAILED DESCRIPTION OF THE EMBODIMENTS

Embodiment 1

Single-Rotary-Wing Electrical Driven Flying Saucer Based on Magnetic Suspension

Figure 1:
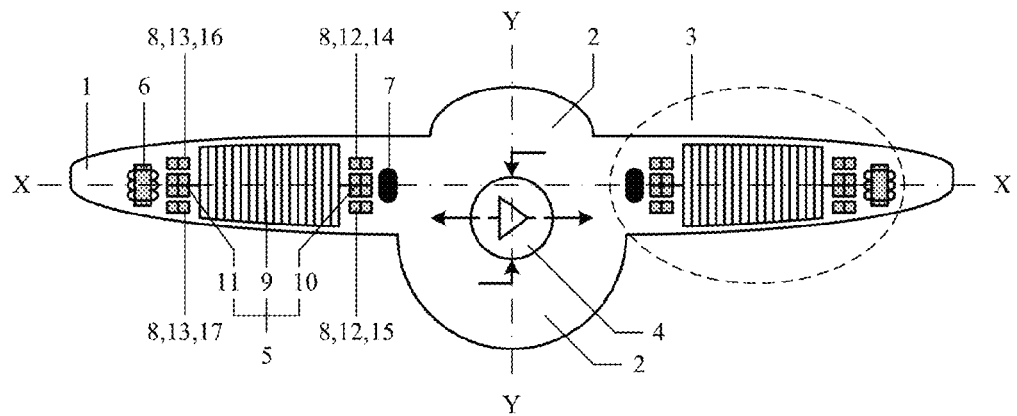
FIG. 1: A side-view sectional schematic of an electrical driven flying saucer based on magnetic suspension.
Figure 2:
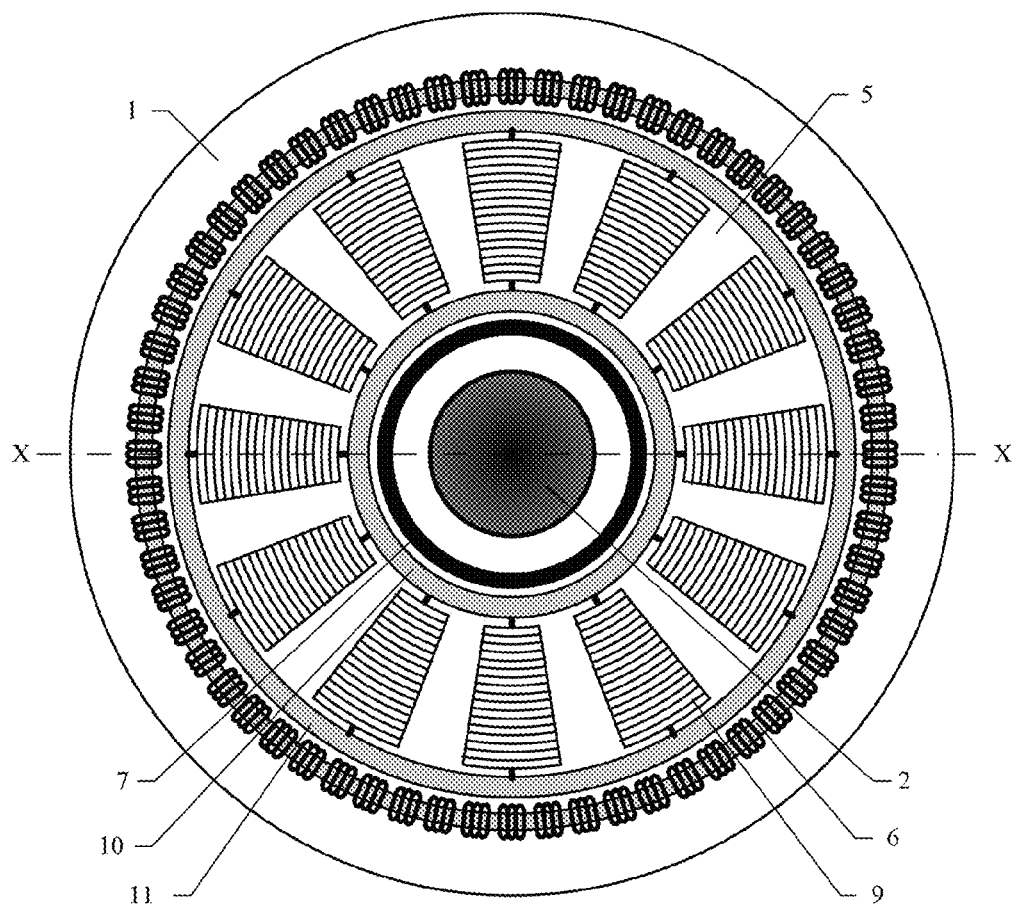
FIG. 2: A top-view schematic of an electrical driven flying saucer based on magnetic suspension.
Figure 3:
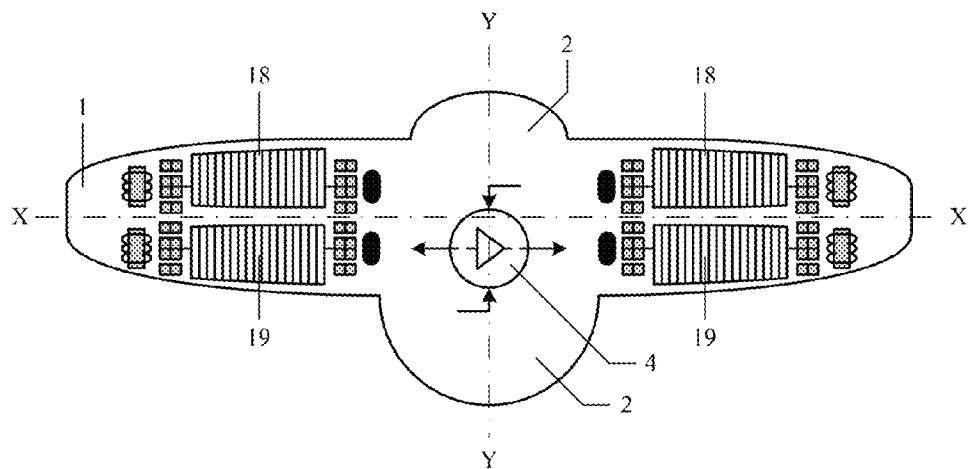
FIG. 3: A side-view sectional schematic of coaxial axial dual electrical driven flying saucer based on magnetic suspensions.
Figure 4:
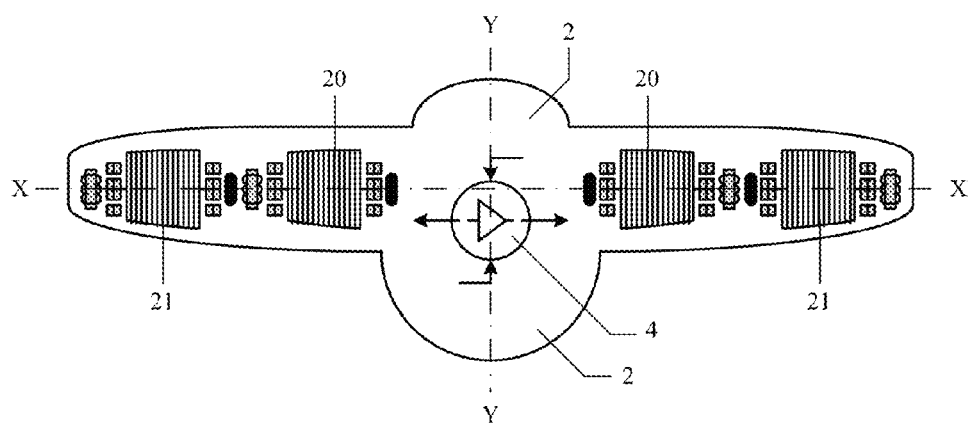
FIG. 4: A side-view sectional schematic of coaxial radial dual electrical driven flying saucer based on magnetic suspensions.

In reference to FIG. 1 and FIG. 2, the single-rotary-wing electrical driven flying saucer based on magnetic suspension comprises: a saucer shell 1, a saucer cabin 2, a rotary-wing system 3 and a control system 4, wherein the rotary-wing system 3 is a magnetic suspension electromotive rotary-wing system and comprises magnetic suspension rotary-wing wheels 5, an electromotive ring 6, a magnetic suspension shaft 7 and a magnetic suspension guide rail 8; the electromotive ring 6, the magnetic suspension shaft 7 and the magnetic suspension guide rail 8 are fixed to the saucer shell 1; the magnetic suspension rotary-wing wheels 5 comprise blades 9, an magnetic suspension inner ring 10 and a magnetic suspension outer ring 11, the blades 9 are connected to the magnetic suspension inner ring 10 and the magnetic suspension outer ring 11 along the radial direction (X-X) and form an impeller; the magnetic suspension guide rail 8 includes a magnetic suspension inner ring guide rail 12 and a magnetic suspension outer ring guide rail 13, the magnetic suspension inner ring guide rail 12 comprises an inner ring upper guideway 14 and an inner ring lower guideway 15, and the magnetic suspension outer ring guide rail 13 comprises an outer ring upper guideway 16 and an outer ring lower guideway 17; the magnetic suspension inner ring 10 of the magnetic suspension rotary-wing wheels 5 goes around the magnetic suspension shaft 7 in the radial direction (X-X) and is disposed between the inner ring upper guideway 14 and the inner ring lower guideway 15 in the axial direction (Y-Y); the magnetic suspension outer ring 11 of the magnetic suspension rotary-wing wheels 5 is embedded in the electromotive ring 6 in the radial direction (X-X) and disposed between the outer ring upper guideway 16 and the outer ring lower guideway 17 in the axial direction (Y-Y).

The magnetic suspension rotary-wing wheels 5 of the electrical driven flying saucer based on magnetic suspension are suspended on the magnetic suspension shaft 7 in the radial direction (X-X) by relying on the magnetic suspension radial bearing formed by the magnetic suspension inner ring 10 and the magnetic suspension shaft 7; the magnetic suspension inner ring 10 of the magnetic suspension rotary-wing wheels 5 is suspended between the inner ring upper guideway 14 and the inner ring lower guideway 15 in the axial direction (Y-Y) by relying on the magnetic suspension axial bearing comprising the magnetic suspension inner ring 10 and the magnetic suspension inner ring guide rail 12; the magnetic suspension outer ring 11 of the magnetic suspension rotary-wing wheels 5 is suspended between the outer ring upper guideway 16 and the outer ring lower guideway 17 in the axial direction (Y-Y) by relying on the magnetic suspension axial bearing comprising the magnetic suspension outer ring 11 and the magnetic suspension outer ring guide rail 13.

Figure 7:
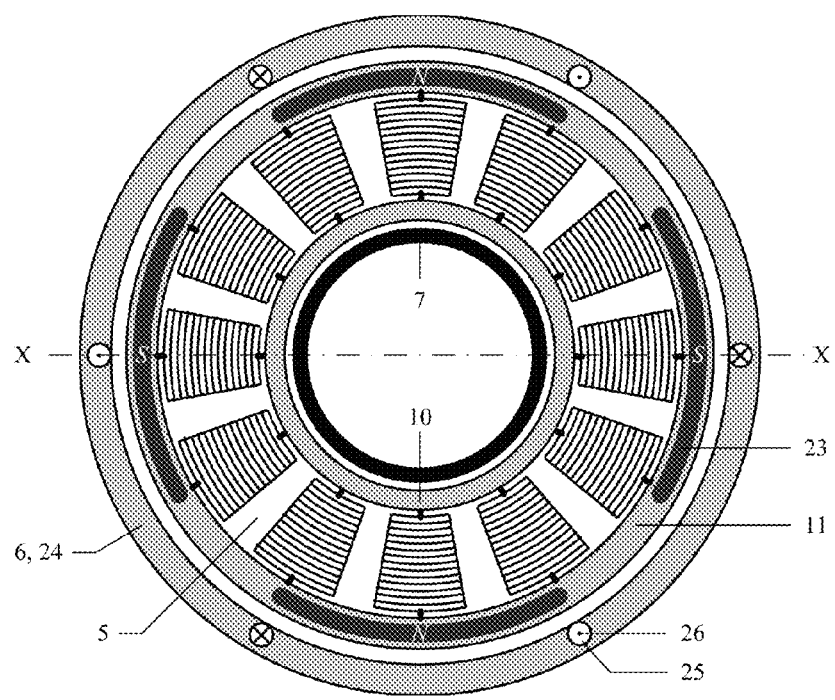
FIG. 7: A schematic of an embodiment of an electric engine.

The magnetic suspension rotary-wing wheels 5 of the electrical driven flying saucer based on magnetic suspension, the electromotive ring 6 and the magnetic suspension shaft 7 constitute a magnetic suspension electric engine. The electric engine of the electrical driven flying saucer based on magnetic suspension may be designed according to general motor theories, the electromotive ring 6 is a stator, the magnetic suspension rotary-wing wheels 5 constitute a rotor, the magnetic suspension shaft 7 is a spindle, and the structure of an ordinary motor is formed. The electric engine of the electrical driven flying saucer based on magnetic suspension adopts a permanent magnet synchronous engine. Its structure is shown in FIG. 7.

The permanent magnet synchronous motor is characterized by a simple and compact structure, low loss, high efficiency and easy manipulation and control. The rotor of a permanent magnet synchronous motor has different structure. For easy description of the principle, this embodiment adopts a simple plug-in structure and pairs of permanent magnets 23 are embedded in the magnetic suspension outer ring 11 to form an exciter field; as a stator, the electromotive ring 6 has a stator core 24, stator grooves 25 are evenly distributed on the inner circle of the stator core 24, and 3-phase symmetric stator windings 26 are distributed inside the stator grooves 25 according to a specific rule to form a rotating magnetic field and push the magnetic suspension rotary-wing wheels 5 as a rotor to rotate.

Embodiment 2

Radial Magnetic Suspension Structure of Rotary-Wing Wheels

An electrical driven flying saucer based on magnetic suspension is provided. Its magnetic suspension rotary-wing wheels 5 are suspended on the magnetic suspension shaft 7 in the radial direction (X-X) according to the magnetic suspension principle.

Figure 5:
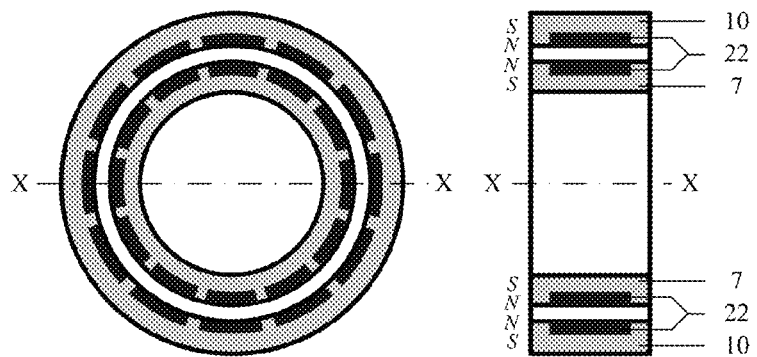
FIG. 5: A schematic of the radial magnetic suspension structure of a rotary-wing wheel.

As shown in FIG. 5, a radial magnetic suspension structure of the magnetic suspension rotary-wing wheels 5 is designed, pairs of magnets 22 are placed on the outer edges of the magnetic suspension inner ring 10 and the magnetic suspension shaft 7 of the magnetic suspension rotary-wing wheels 5, the N poles of the magnets of the magnetic suspension inner ring 10 face the inside and the S poles face the outside; the S poles of the magnets of the magnetic suspension shaft 7 face the inside and the N poles face the outside. According to the principle that like poles of magnets expel, the N pole of the outer edge of the magnetic suspension inner ring 10 and the N pole of the outer edge of the magnetic suspension shaft 7 form a repulsive force. Therefore, the radial magnetic suspension structure of the magnetic suspension rotary-wing wheels 5 as shown in FIG. 5 may realize the suspension of the magnetic suspension rotary-wing wheels 5 in the radial direction (X-X) of the flying saucer.

Magnets 22 may be made from a homogeneous and evenly distributed permanent magnet material. Ideally, the outer edge of the magnetic suspension inner ring 10 and the outer edge of the magnetic suspension shaft 7 are in an equal-distance state. When the magnetic suspension rotary-wing wheels 5 are disturbed, the outer edge of the magnetic suspension inner ring 10 and the outer edge of the magnetic suspension shaft 7 may deviate from the equal-distance position. Nevertheless, as magnetic field intensity decreases with the increase of the distance and increases with the decrease of the distance, the magnetic suspension inner ring 10 and the magnetic suspension shaft 7 will automatically return to the equal-distance position. Obviously, the radial magnetic suspension structure of the permanent magnet rotary-wing wheel is a natural stable structure.

Alternatively, the magnets 22 may also be made from an electromagnet material. The radial (X-X) suspension structure of the magnetic suspension rotary-wing wheels 5 designed by using electromagnets may realize good controllability, easy implementation of various advanced control strategies and optimal axial (X-X) magnetic suspension effect of the magnetic suspension rotary-wing wheels 5.

The magnets of the magnetic suspension inner ring 10 in FIG. 5 may be changed into a superconducting material. When it is in a superconducting state, according to the Meissner effect, the magnetic suspension inner ring 10 will form a repulsive force with the magnetic suspension shaft 7, thereby realizing superconducting magnetic suspension. By then, if the magnets on the magnetic suspension shaft 7 are permanent magnets, the superconducting magnetic suspension can also obtain a natural stable structure; if the magnets on the magnetic suspension shaft 7 are electromagnets, the superconducting magnetic suspension can also obtain good controllability and may implement various advanced control strategies based on automation theories.

Embodiment 3

Axial Magnetic Suspension Structure of Rotary-Wing Wheels

An electrical driven flying saucer based on magnetic suspension is provided. Its magnetic suspension rotary-wing wheels 5 are suspended on the magnetic suspension guide rail 8 in the axial direction (Y-Y) according to the magnetic suspension principle, i.e.: the magnetic suspension inner ring 10 is suspended between the inner ring upper guideway 14 and the inner ring lower guideway 15, and the magnetic suspension outer ring 11 is suspended between the outer ring upper guideway 16 and the outer ring lower guideway 17.

Figure 6:
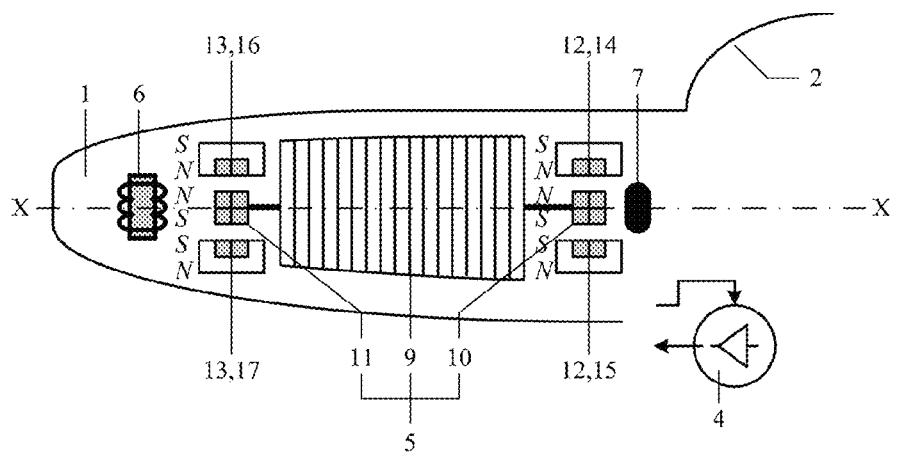
FIG. 6: A schematic of the axial magnetic suspension structure of a rotary-wing wheel.

As shown in FIG. 6, an axial magnetic suspension structure of the magnetic suspension rotary-wing wheels 5 is designed to make the N poles of the magnets of the magnetic suspension inner ring 10 and the magnetic suspension outer ring 11 face upward and the S poles face downward; the S poles of the magnets of the inner ring upper guideway 14 and the outer ring upper guideway 16 face upward and the N poles face downward; the S poles of the magnets of the inner ring lower guideway 15 and the outer ring lower guideway 17 face upward and the N poles face downward. According to the principle that like poles of magnets repel, the N pole at the top of the magnetic suspension inner ring 10 and the N pole at the bottom of the inner ring upper guideway 14 form a repulsive force, and the S pole at the bottom of the magnetic suspension inner ring 10 and the S pole at the top of the inner ring lower guideway 15 form a repulsive force; the N pole at the top of the magnetic suspension outer ring 11 and the N pole at the bottom of the outer ring upper guideway 16 form a repulsive force, and the S pole at the bottom of the magnetic suspension outer ring 11 and the S pole at the top of the outer ring lower guideway 17 form a repulsive force. Therefore, the radial magnetic suspension structure of the magnetic suspension rotary-wing wheels 5 as shown in FIG. 6 may realize the suspension of the magnetic suspension rotary-wing wheels 5 in the axial direction (Y-Y) of the flying saucer. In the radial magnetic suspension structure of the magnetic suspension rotary-wing wheels 5 as shown in FIG. 6, the magnets may adopt a homogenous and evenly distributed permanent magnet material. Considering weight and other factors, the upper and lower guideways of the magnetic suspension guide rail 8 are designed and different magnetic field intensity is selected to make the magnetic suspension ring located in an approximately equal-distance position of the upper guideway and the lower guideway. When the magnetic suspension rotary-wing wheels 5 vibrate up and down under the influence of air current, the magnetic suspension inner ring 10 and the magnetic suspension outer ring 11 may deviate from the equal-distance position. However, as magnetic field intensity decreases with the increase of distance and increases with the decrease of distance, the magnetic suspension inner ring 10 and the magnetic suspension outer ring 11 will automatically return to the equal-distance position. Thus it may be seen, the axial magnetic suspension structure of the permanent magnet rotary-wing wheels is a natural stable structure. In the radial magnetic suspension structure of the magnetic suspension rotary-wing wheels 5 as shown in FIG. 6, the magnets may also adopt an electromagnet material. The axial (Y-Y) suspension structure of the magnetic suspension rotary-wing wheels 5 designed with electromagnets may obtain good controllability, easily implement various advanced control strategies and obtain optimal axial (Y-Y) magnetic suspension effect of the magnetic suspension rotary-wing wheels 5.

The magnets of the magnetic suspension inner ring 10 and the magnetic suspension outer ring 11 of the magnetic suspension rotary-wing wheels 5 in FIG. 6 may be changed into a superconducting material. When they are in a superconducting state, according to the Meissner effect, the magnetic suspension ring of the magnetic suspension rotary-wing wheels 5 will form a repulsive force with the upper guideway and the lower guideway, thereby realizing magnetic suspension. In this case, if the magnets on the inner magnetic suspension guide rail 12 and the outer magnetic suspension guide rail 13 are permanent magnets, the superconducting magnetic suspension can also obtain a natural stable structure; if the magnets on the inner magnetic suspension guide rail 12 and the outer magnetic suspension guide rail 13 are electromagnets, the superconducting magnetic suspension can also obtain good controllability and various advanced control strategies may be implemented according to the automation theory.

Embodiment 4

Electric Engine

An electrical driven flying saucer based on magnetic suspension is provided. The magnetic suspension rotary-wing wheel 5 of its rotary-wing system 3, the electromotive ring 6 and the magnetic suspension shaft 7 constitute a magnetic suspension electric engine. The electric engine of the electrical driven flying saucer based on magnetic suspension may be designed according to the general motor principle, the electromotive ring 6 is a stator, the magnetic suspension rotary-wing wheels 5 constitute a rotor, the magnetic suspension shaft 7 is a spindle and an ordinary motor structure is formed.

The structure and principle of the electric engine of the electrical driven flying saucer based on magnetic suspension may be same as those of a synchronous motor, an asynchronous motor or a DC motor.

A typical embodiment of the electric engine of the electrical driven flying saucer based on magnetic suspension is a permanent magnet synchronous engine. Its schematic structure is as shown in FIG. 7.

The permanent magnet synchronous motor is characterized by a simple and compact structure, low loss, high efficiency and easy manipulation and control. The rotor of the permanent magnet synchronous motor may have a different structure. For easy description of the principle, this embodiment adopts a simple plug-in structure and pairs of permanent magnets 23 are embedded in the magnetic suspension outer ring 11 to form an exciter field; the electromotive ring 6 as a stator has a stator core 24, stator grooves 25 are evenly distributed on the inner circle of the stator core 24, and the 3-phase symmetric stator windings 26 are distributed inside the stator grooves 25 according to a specific rule to form a rotating magnetic field and push the magnetic suspension rotary-wing wheels 5 as a rotor to rotate.

Embodiment 5

Coaxial Axial Dual Magnetic Suspension Electromotive Rotary Wings

An electrical driven flying saucer based on magnetic suspension adopts coaxial axial dual magnetic suspension electromotive rotary-wing systems when it improves its rotary-wing system to overcome the reactive torque of the rotary wings. The coaxial axial dual magnetic suspension electromotive rotary-wing systems include an upper rotary-wing system 18 and a lower rotary-wing system 19. The upper and lower rotary-wing systems adopt a same structure and both comprise magnetic suspension rotary-wing wheels 5, electromotive rings 6, magnetic suspension shafts 7 and magnetic suspension guide rails 8.

During work, the respective electromotive rings of the upper and lower rotary-wing systems generate rotating magnetic fields in reverse directions, which drive respective magnetic suspension rotary-wing wheels to rotate in reverse directions. The upper and lower magnetic suspension rotary-wing wheels maintain a same absolute rotation speed and may offset respective reactive torques and maintain stability of the saucer shell; the upper and lower rotary-wing systems provide lift or forward thrust in the same time and greatly enhance the power performance of the flying saucer.

Embodiment 6

Coaxial Radial Dual Magnetic Suspension Electromotive Rotary Wings

An electrical driven flying saucer based on magnetic suspension adopts coaxial radial dual magnetic suspension electromotive rotary-wing systems when it improves its rotary-wing system to overcome the reactive torque of the rotary wings. The coaxial radial dual magnetic suspension electromotive rotary-wing systems include an inner rotary-wing system 20 and an outer rotary-wing system 21. The upper and lower rotary-wing systems adopt a same structure and both comprise magnetic suspension rotary-wing wheels 5, electromotive rings 6, magnetic suspension shafts 7 and magnetic suspension guide rails 8.

During work, the respective electromotive rings of the inner and outer rotary-wing systems generate rotating magnetic fields in reverse directions, which drive respective magnetic suspension rotary-wing wheels to rotate in reverse directions. The inner and outer magnetic suspension rotary-wing wheels maintain a rated absolute speed difference and may offset respective reactive torques and maintain stability of the saucer shell; the inner and outer rotary-wing systems provide lift or forward thrust in the same time and enhance the power performance of the flying saucer.

The coaxial radial dual magnetic suspension electromotive rotary-wing systems adopt dual rotary-wing systems placed on a same plane, so the air current disturbance between the two magnetic suspension rotary-wing wheels is reduced significantly and the controllability and stability of the rotary-wing systems are significantly improved.

What is claimed includes:

1. An electrical driven flying saucer based on magnetic suspension, comprising a saucer shell, a saucer cabin, a rotary-wing system and a control system, wherein the rotary-wing system is a magnetic suspension electromotive rotary-wing system and comprises magnetic suspension rotary-wing wheels, an electromotive ring as a stator, a magnetic suspension shaft separated from the electromotive ring and a magnetic suspension guide rail separated from the electromotive ring and the magnetic suspension shaft; the electromotive ring, the magnetic suspension shaft and the magnetic suspension guide rail are fixed to the saucer shell; the magnetic suspension rotary-wing wheels are suspended in the space restricted by the electromotive ring, the magnetic suspension shaft and the magnetic suspension guide rail and go around the magnetic suspension shaft under electromagnetic thrust;

wherein the magnetic suspension rotary-wing wheels comprise blades, a magnetic suspension inner ring and a magnetic suspension outer ring, the blades are connected between the magnetic suspension inner ring and the magnetic suspension outer ring along the radial direction and form an impeller; the magnetic suspension guide rail includes a magnetic suspension inner ring guide rail and a magnetic suspension outer ring guide rail, the magnetic suspension inner ring guide rail comprises an inner ring upper guideway and an inner ring lower guideway, and the magnetic suspension outer ring guide rail comprises an outer ring upper guideway and an outer ring lower guideway; the magnetic suspension inner ring of the magnetic suspension rotary-wing wheels surrounds the magnetic suspension shaft in the radial direction and is disposed between the inner ring upper guideway and the inner ring lower guideway in the axial direction; the magnetic suspension outer ring of the magnetic suspension rotary-wing wheels is surrounded by the electromotive ring in the radial direction and is disposed between the outer ring upper guideway and the outer ring lower guideway in the axial direction;

wherein a plurality of magnets are evenly distributed on an inner side of the magnetic suspension inner ring and a plurality of magnets are evenly distributed on an outer side of the magnetic suspension shaft which are paired with and directly face the magnets on the inner side of the magnetic suspension inner ring to form a repulsive or attractive magnetic suspension radial bearing in the radial direction by relying on permanent magnets, or electromagnets or superconducting magnets, and make the magnetic suspension rotary-wing wheels suspended on the magnetic suspension shaft in the radial direction;

wherein the inner ring upper guideway, the inner ring lower guideway, the outer ring upper guideway and the outer ring lower guideway comprise magnets made of permanent magnet material;

wherein the magnetic suspension inner ring of the magnetic suspension rotary-wing wheels and the magnetic suspension inner ring guide rail form a repulsive or attractive magnetic suspension axial bearing in the axial direction by relying on permanent magnets, or electromagnets or superconducting magnets, and make the magnetic suspension inner ring suspended between the inner ring upper guideway and the inner ring lower guideway; the magnetic suspension outer ring of the magnetic suspension rotary-wing wheels and the magnetic suspension outer ring guide rail form a repulsive or attractive magnetic suspension axial bearing in the axial direction by relying on permanent magnets, or electromagnets or superconducting magnets, and make the magnetic suspension outer ring suspended between the outer ring upper guideway and the outer ring lower guideway;

wherein the magnetic suspension rotary-wing wheels of the rotary-wing system, the electromotive ring and the magnetic suspension shaft constitute a magnetic suspension electric engine as the source of the power of the flying saucer's rotary wing system, wherein the electromotive ring is a stator, the magnetic suspension rotary-wing wheels constitute a rotor, and the magnetic suspension shaft is a spindle and;

wherein the magnetic suspension electric engine further comprises pairs of permanent magnets embedded in the magnetic suspension outer ring to form an exciter field, and wherein the electromotive ring being a stator has a stator core and a plurality of stator grooves evenly distributed on an inner circle of the stator core, 3-phase symmetric stator windings are distributed inside the stator grooves for generating a rotating magnetic field to push the magnetic suspension rotary-wing wheels to rotate about the magnet suspension shaft serving as a spindle.

2. An electrical driven flying saucer based on magnetic suspension as in claim 1, wherein there are two sets of the rotary-wing systems including an upper rotary-wing system and a lower rotary-wing system, the upper rotary-wing system and the lower rotary-wing system are superposed and mounted coaxially inside the saucer shell in the axial direction, and the upper rotary-wing system and the lower rotary-wing system rotate in reverse directions and adopt reverse inclination directions of blades.

3. An electrical driven flying saucer based on magnetic suspension as in claim 1, wherein there are two sets of the rotary-wing systems including an inner rotary-wing system and an outer rotary-wing system, the inner rotary-wing system and the outer rotary-wing system are superposed and mounted coaxially inside the saucer shell in a radial direction, and the inner rotary-wing system and the outer rotary-wing system rotate in reverse directions and adopt reverse inclination directions of blades.

* * * * *